F. GEIGER.
EMERY WHEEL GUARD AND SUPPORTING BRACKET THEREFOR.
APPLICATION FILED JUNE 11, 1915.

1,158,127.

Patented Oct. 26, 1915.
2 SHEETS—SHEET 1.

INVENTOR
Frederick Geiger.
By Hull, Smith, Brock & West
ATT'YS.

F. GEIGER.
EMERY WHEEL GUARD AND SUPPORTING BRACKET THEREFOR.
APPLICATION FILED JUNE 11, 1915.
1,158,127.
Patented Oct. 26, 1915.
2 SHEETS—SHEET 2.
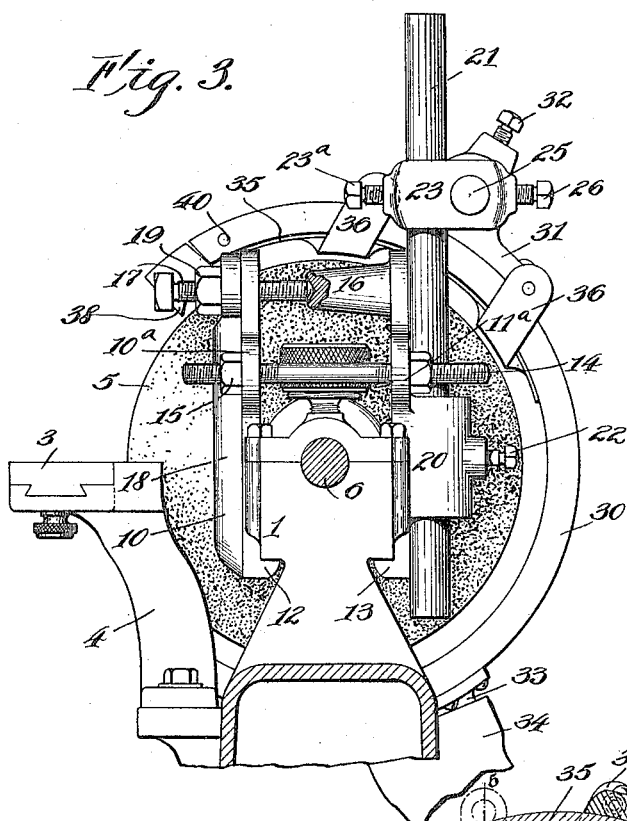
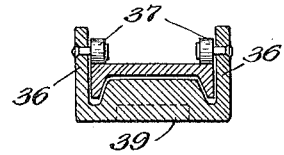
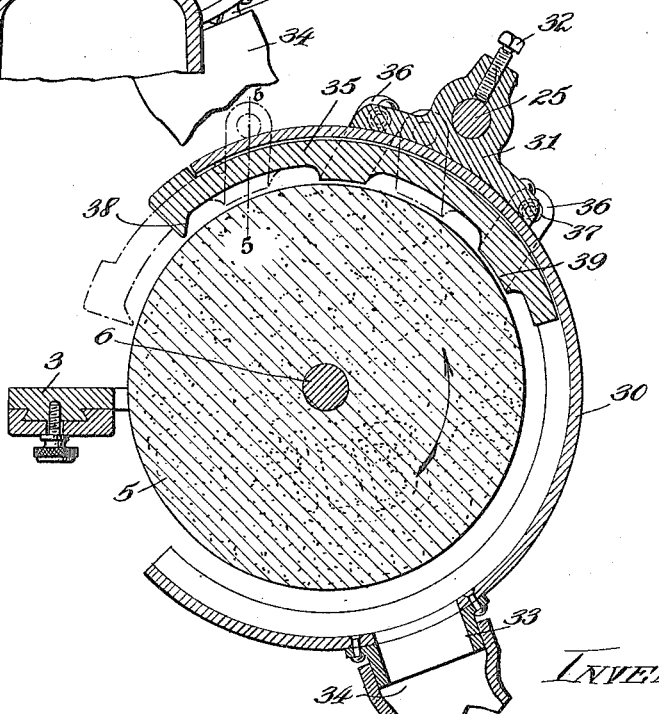

UNITED STATES PATENT OFFICE.

FREDERICK GEIGER, OF CLEVELAND, OHIO.

EMERY-WHEEL GUARD AND SUPPORTING-BRACKET THEREFOR.

1,158,127.  Specification of Letters Patent.  Patented Oct. 26, 1915.

Application filed June 11, 1915. Serial No. 33,456.

*To all whom it may concern:*

Be it known that I, FREDERICK GEIGER, a citizen of the United States, residing at Cleveland, in the county of Cuyahoga and State of Ohio, have invented a certain new and useful Improvement in Emery-Wheel Guards and Supporting-Brackets Therefor, of which the following is a full, clear, and exact description, reference being had to the accompanying drawings.

This invention relates to protective guards for abrading wheels, and to supporting means therefor; and it has for its objects to provide a guard which embraces all but a small portion of the periphery of the wheel, such portion being exposed for abrading purposes, and to incorporate within such guard, means for automatically closing the space through which the aforesaid portion of the wheel is exposed, should the wheel break; to provide a bracket for supporting the guard from a portion of the abrading wheel stand, such device being adaptable to practically all prevailing types and sizes of stands of this character; to provide a supporting device of the aforesaid nature which may be very easily and quickly applied to or removed from the stand without the use of special tools; to provide a device comprising, generally, an emery wheel guard, a clamp that is adapted to be applied to the journal box of abrading wheel stands of various sizes and types, and involving universal connections between the guard and clamp whereby the guard may be adjusted and held in proper relation to the abrading wheel.

A further object is the provision of a device that may be clamped to a journal box without the necessity of preparing the journal box especially for the application of the clamp, and which clamp is so formed as to avoid interference with the lubricant cup usually found upon such journal boxes; and to provide a clamp of the aforesaid nature which comprises, generally, a pair of jaws that are loosely connected intermediate their ends, and between corresponding ends of which there is located a spreading device for separating such ends with the result of moving the opposite ends of the jaws together to firmly engage portions of the journal box.

Figure 1:
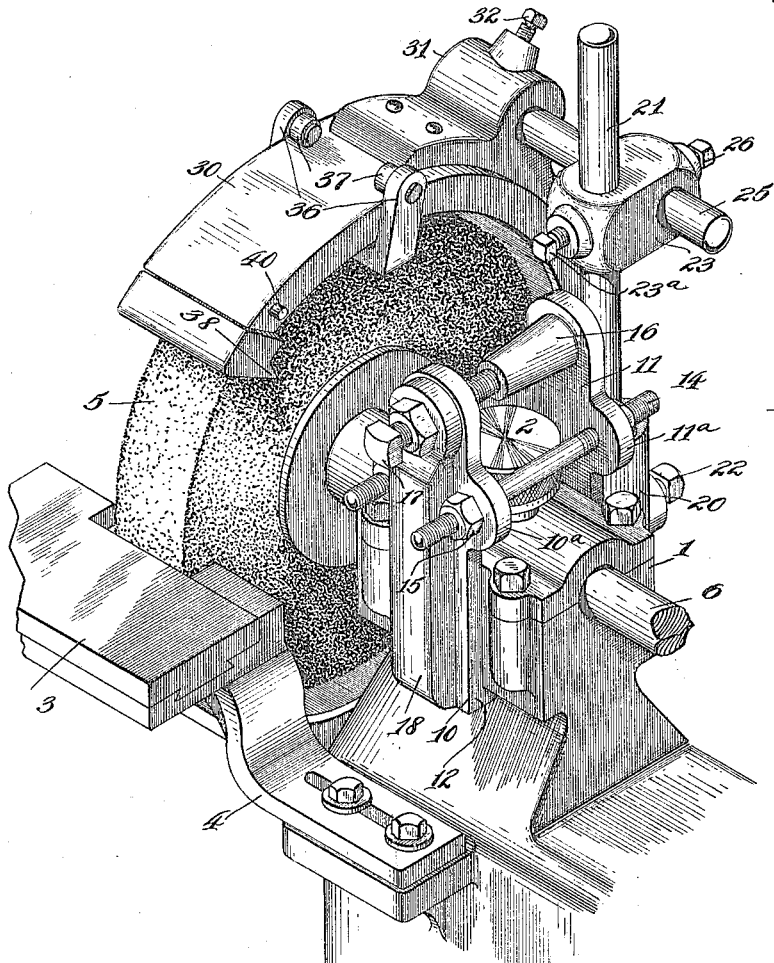
Figure 2:
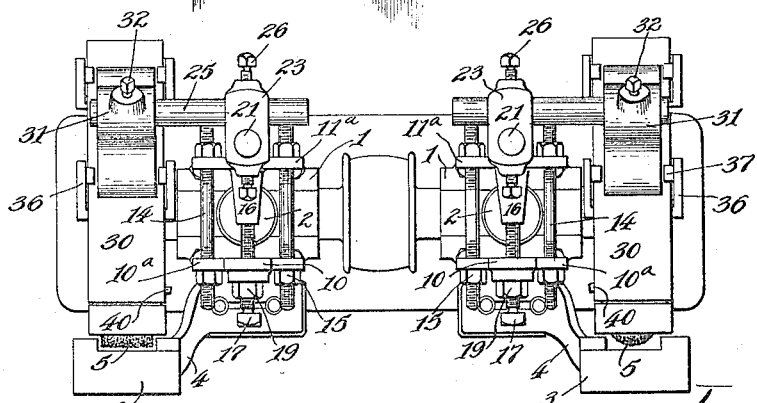

In the accompanying drawings, Figure 1 is a perspective view of a portion of an emery wheel stand to which is applied the device of my invention; Fig. 2 is a plan view of a duo-wheel stand, to each wheel of which is applied a guard, the same being supported from the adjacent journal box, by means of the bracket and clamp shown in Fig. 1; Fig. 3 is a transverse section through the emery wheel stand, adjacent the inner side of the journal box, showing the clamp, bracket, and guard in elevation; Fig. 4 is a central vertical section through the guard and an adjacent portion of the stand; and Fig. 5 is a transverse section through the guard, on the line 5—5 of Fig. 4, in Fig. 5 the gate of the guard being shown in the position indicated by dot-and-dash lines in Fig. 4.

Describing the invention by the use of reference characters, 1 represents the journal box of an emery wheel stand of ordinary type, the same being provided with the usual lubricant cup 2. The stand has attached to it a tool-rest 3, by means of a bracket 4, the tool-rest being supported adjacent the grinding surface of the emery wheel 5, which is secured to the end of a shaft 6, in the usual manner.

A jaw 10 engages the front surface, and a similar jaw 11 the rear surface of the journal box 1, and each jaw has its lower edge turned toward the other at substantially right angles beneath the bottom of the journal box, as shown at 12 and 13, respectively. At a point above the top of the journal box, the respective jaws have lateral extensions $10^a$ and $11^a$. These extensions are provided with apertures through which freely pass the threaded ends of studs 14, and outside the extensions, the studs have applied to them the nuts 15.

Extending forward from the upper end of the rear jaw 11, is a boss 16, the forward, indented end of which receives the end of a screw 17 that is threaded through the thickened upper end of the jaw 10, the latter jaw being strengthened throughout its length by a rib 18. A lock nut 19 is applied to the screw 17 between its head and the adjacent surface of the jaw.

In applying the clamp to a journal box, the nuts 15 are threaded inward along the studs 14 until the jaws approach each other to within a distance corresponding to the transverse dimension of the journal box. Thereafter, the screw 17 is turned to force the upper ends of the jaws apart, and consequently move the lower ends of said jaws into engagement with the journal box. During this operation, it may be found necessary to "set-up" on the nuts 15 in order to keep the entire inner surfaces of the lower portions of the jaws 10 and 11 in contact with the adjacent surfaces of the journal box. When, through this adjustment, the clamp is firmly screwed to the journal box, it may be held in such condition against being loosened from the vibration of the machine, by tightening up the lock nut 19. Attention is called to the fact that the studs 14 are separated a sufficient distance, and the boss 16 and screw 17 are at a high enough elevation, to prevent any of these parts from interfering with the lubricant cup 2 of the journal box.

A vertically disposed hollow boss 20 extends from the rear side of the jaw 11, and within this boss there is adapted to be clamped in various adjusted positions, a vertical bar 21, by means of a set screw 22, that is threaded through the rear wall of the boss 20. A block 23, through which the bar 21 passes, is adapted to be secured to said bar, at any desired elevation, by means of a set screw 23ª, that is threaded through one end of the block and bears against the bar. Passing transversely through the other end of the block 23, and at right angles to the bar 21, is a horizontal bar 25, that is clamped within the block by the set screw 26. The bar 25 extends out over the abrading wheel 5 and has applied to it the protective guard which will now be described.

The guard comprises an inwardly opening channel member 30 which is somewhat wider than the abrading wheel, and is curved to embrace substantially three-fourths of the circumference of the wheel. Applied to the outer surface of the channel member, near one of its ends, is a socket member 31, for the reception of the end of the previously mentioned bar 25, the bar being secured within the socket member, by means of the set screw 32. The socket member is so located with respect to the space between the ends of the channel member 30, that, when the same is applied to the bar 25, and said bar and the bar 21 are so adjusted through their various adjustable connections as to bring the member 30 substantially concentric with the shaft of the abrading wheel, the space between the ends of the member 30 is located at the front of the wheel so that the wheel may be easily reached for the purpose of grinding. Near its bottom, the channel member 30 has a tubular extension 33 for the application of a suction member 34, for carrying off the dust which results from the grinding operation.

A segmental gate 35 is slidable within the channel member 30 and normally occupies a position in the upper portion thereof, leaving exposed a considerable extent of the abrading wheel above the tool-rest 3. The gate is supported from the member 30 by having its lugs 36 extend up on each side of the channel member and provided with anti-friction rollers 37 which ride upon the upper surface of the channel member. (See Fig. 5). At its forward end, the gate 35 is enlarged in a direction perpendicular to the surface of the abrading wheel, so that the outer surface of the gate, at this point, is substantially flush with the outer surface of the channel member 30, and so that an inwardly projecting lip 38 is formed which approaches, very closely, the surface of the abrading wheel. The gate is provided with transverse ribs 39 on its inner surface which connect the inner ends of the lugs 36, as shown clearly in Figs. 4 and 5. A pin 40 projects from the side of the upper end of the channel member in a position to be engaged by one of the forward lugs 36 of the gate, to limit the forward movement of the gate.

Ordinarily the gate 35 is in open position as illustrated in the drawings, so that sufficient of the abrading surface of the wheel is exposed for all practical grinding purposes, and the dust which results from the grinding operation is drawn off through the suction member or conduit 34. It is understood that the abrading wheel rotates in the direction indicated by the arrow in Fig. 4; and should the wheel break, the flying pieces would be whirled in a direction to engage either the transverse ribs 39 or the lip 38 of the gate 35, immediately sliding said gate in the direction of the tool-rest, as indicated in dotted lines in Fig. 4. Thus it will be seen that, in such an emergency, the operator who stands in front of the wheel, is effectually protected against injury from the flying pieces.

From the foregoing description it will be seen that besides providing a very efficient protective guard for abrading wheels, my invention also provides a convenient means of supporting such guard from the journal boxes of the wheel stands, which means may be adjusted to adapt itself to practically all types and sizes of abrading wheel stands.

Upon an inspection of Fig. 2, it will be seen that the guard supporting bracket is reversible for use with wheels located at either the right or left hand ends of stands.

While I have necessarily described my invention in detail, I do not propose to be limited to such details except as required by the terms of the annexed claims or as may be rendered necessary by the prior state of the art.

Having thus described my invention, what I claim is:—

1. A protective guard for abrading wheels comprising an inwardly opening channel member that embraces a portion of the circumference of the wheel and having its inner surface spaced from the periphery thereof, a gate slidable within one end of the channel member and arranged to be projected across the exposed portion of the periphery of the wheel, said gate having fragment engaging portions, and connections between the gate and the aforesaid member.

2. A protective guard for abrading wheels comprising an inwardly opening channel member that embraces a portion of the circumference of the wheel and having its inner surface spaced from the periphery thereof, a gate slidable within one end of the channel member and arranged to be projected across the exposed portion of the periphery of the wheel, said gate having projections which are located between the inner surface and the periphery of the wheel, connections between the gate and the aforesaid member, and stops for limiting the movement of the gate in both directions.

3. A protective guard for abrading wheels comprising a curved, inwardly opening channel member, the inner surface whereof is concentric to and spaced from the periphery of the wheel, a gate slidably supported adjacent one end of said channel member, and having fragment engaging portions, and stops for limiting the movement of the gate in both directions.

4. A protective guard for abrading wheels comprising a curved, inwardly opening channel member, the inner surface whereof is concentric to and spaced from the periphery of the wheel, a gate slidable within one end of said channel member and having fragment engaging portions and extensions which project up along each side of the channel member, devices carried by said extension which overlie the outer surface of the channel member, and stops for limiting the movement of the gate in both directions.

5. A device of the character described comprising an inwardly opening channel member which embraces a part of the circumference of an abrading wheel, said channel member having a tubular extension that is located beneath the abrading wheel and arranged to have connection with a suction device.

6. A device of the character described comprising, in combination, a bar, means for supporting said bar in a substantially vertical position from a portion of an abrading wheel stand, a protective guard for the abrading wheel, a bar secured thereto in a substantially horizontal position, and a member for connecting said bars, said member being adjustable angularly and longitudinally with respect to each bar.

7. A device of the character described comprising, in combination, supporting means for application to a portion of an abrading wheel stand, a bar supported thereby in a substantially vertical position, a protective guard for the abrading wheel, a bar extending laterally therefrom and having adjustable connection therewith, and a member for connecting the aforesaid bars, said member being angularly and longitudinally adjustable with respect to each.

8. A device of the character described comprising, in combination, supporting means for application to a portion of an abrading wheel stand, said means having a vertically disposed socket, a bar that is arranged to be received by said socket, means for clamping said bar within said socket at various elevations, a protective guard for the abrading wheel, a bar extending laterally therefrom and having adjustable connection therewith, a member for connecting the aforesaid bars, said member being angularly and longitudinally adjustable with respect to each, and means for locking said member to said bars.

9. A device of the character described comprising, in combination, a pair of opposed jaws, one for application to each side of a journal box of an abrading wheel stand, said jaws having connection with each other intermediate their ends and above the top of the journal box, means for spreading apart the upper ends of said jaws, a bar that is supported in a substantially vertical position by one of the jaws, a guard for the abrading wheel, a bar projecting laterally therefrom and having adjustable connections therewith, and means for adjustably connecting the aforesaid bars.

10. A device of the character described comprising, in combination, a pair of opposed jaws, one for application to each side of a journal box of an abrading wheel stand, said jaws having connection with each other intermediate their ends and above the top of the journal box, means for spreading apart the upper ends of said jaws, one of said jaws having a vertically disposed socket, a bar that is arranged to be received thereby, means for locking said bar at any desired elevation within said socket, a guard for the abrading wheel, a bar projecting laterally therefrom and having adjustable connection therewith, and means for adjustably connecting the aforesaid bars.

11. A device of the character described comprising, in combination, a pair of opposed jaws, one for engagement with each side of the journal box of an abrading wheel stand, said jaws having adjustable connection with each other intermediate their ends and above the top of the journal box, means for separating the upper ends of the jaws, a protective guard for the abrading wheel, and connections between said guard and one of the aforesaid jaws.

12. A device of the character described, comprising, in combination, a pair of opposed jaws, one for engagement with each side of the journal box of an abrading wheel stand, a pair of laterally spaced studs extending through the jaws intermediate the ends thereof and above the journal box, nuts applied to said studs for engagement with the outer surfaces of the jaws, a screw threaded through the upper end of one of said jaws and having its end bearing upon a portion of the other jaw, a protective guard for the abrading wheel, and connection between said guard and one of the aforesaid jaws.

In testimony whereof, I hereunto affix my signature in the presence of two witnesses.

FREDERICK GEIGER.

Witnesses:
OSCAR A. PLOTZ,
BRENNAN B. WEST.

Copies of this patent may be obtained for five cents each, by addressing the "Commissioner of Patents, Washington, D. C."